US011532832B2

(12) United States Patent
Nie et al.

(10) Patent No.: US 11,532,832 B2
(45) Date of Patent: Dec. 20, 2022

(54) ALL-VANADIUM SULFATE ACID REDOX FLOW BATTERY SYSTEM

(71) Applicant: Battelle Memorial Institute, Richland, WA (US)

(72) Inventors: Zimin Nie, Richland, WA (US); Wei Wang, Kennewick, WA (US); Xiaoliang Wei, Richland, WA (US); Bin Li, Richland, WA (US); Jun Liu, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 449 days.

(21) Appl. No.: 16/859,142

(22) Filed: Apr. 27, 2020

(65) Prior Publication Data

US 2020/0259200 A1    Aug. 13, 2020

Related U.S. Application Data

(63) Continuation of application No. 14/875,565, filed on Oct. 5, 2015, now Pat. No. 10,673,090.

(60) Provisional application No. 62/060,438, filed on Oct. 6, 2014.

(51) Int. Cl.
*H01M 8/00* (2016.01)
*H01M 8/20* (2006.01)
*H01M 8/18* (2006.01)

(52) U.S. Cl.
CPC ............. *H01M 8/20* (2013.01); *H01M 8/188* (2013.01); *Y02E 60/50* (2013.01)

(58) Field of Classification Search
CPC .......... H01M 8/188; H01M 8/20; Y02E 60/50
See application file for complete search history.

(56) References Cited

U.S. PATENT DOCUMENTS

| 3,540,933 A | 11/1970 | Boeke |
| 3,996,064 A | 12/1976 | Thaller |
| 4,469,760 A | 9/1984 | Giner et al. |

(Continued)

FOREIGN PATENT DOCUMENTS

| CN | 1768442 A | 5/2006 |
| CN | 1770503 A | 5/2006 |

(Continued)

OTHER PUBLICATIONS

Adam, J., "Vanadium Chloride Battery," Thesis, pp. 1-78, School of Chemical Engineering, The University of New South Wales (Oct. 2008).

(Continued)

*Primary Examiner* — Cynthia H Kelly
*Assistant Examiner* — Monique M Wills
(74) *Attorney, Agent, or Firm* — Klarquist Sparkman, LLP

(57) ABSTRACT

All-vanadium sulfate redox flow battery systems have a catholyte and an anolyte comprising an aqueous supporting solution including chloride ions and phosphate ions. The aqueous supporting solution stabilizes and increases the solubility of vanadium species in the electrolyte, allowing an increased vanadium concentration over a desired operating temperature range. According to one example, the chloride ions are provided by $MgCl_2$, and the phosphate ions are provided by $(NH_4)_2HPO_4$.

20 Claims, 4 Drawing Sheets

(56) References Cited

U.S. PATENT DOCUMENTS

| | | | |
|---|---|---|---|
| 4,786,567 | A | 11/1988 | Skyllas-Kazacos et al. |
| 4,814,241 | A | 3/1989 | Nagashima et al. |
| 6,562,514 | B1 | 5/2003 | Kazacos et al. |
| 6,872,376 | B2 | 3/2005 | Tanaka et al. |
| 7,078,123 | B2 | 7/2006 | Kazacos et al. |
| 7,320,844 | B2 | 1/2008 | Skyllas-Kazacos |
| 8,628,880 | B2 | 1/2014 | Li et al. |
| 8,771,856 | B2 | 7/2014 | Li et al. |
| 9,077,011 | B2 | 7/2015 | Li et al. |
| 9,123,931 | B2 | 9/2015 | Li et al. |
| 2003/0014345 | A1 | 1/2003 | Lim |
| 2003/0143456 | A1 | 7/2003 | Kazacos et al. |
| 2005/0244707 | A1 | 11/2005 | Skyllas-Kazacos et al. |
| 2006/0183016 | A1 | 8/2006 | Kazacos et al. |
| 2008/0292964 | A1 | 11/2008 | Kazacos et al. |
| 2010/0230632 | A1 | 9/2010 | Adamson et al. |
| 2010/0291420 | A1 | 11/2010 | Kazacos et al. |
| 2011/0027629 | A1 | 2/2011 | Deane |
| 2011/0045332 | A1 | 2/2011 | Horne et al. |
| 2011/0086247 | A1 | 4/2011 | Keshavarz et al. |
| 2012/0040216 | A1 | 2/2012 | Parakulam |
| 2012/0052347 | A1 | 3/2012 | Wilson et al. |
| 2012/0077067 | A1 | 3/2012 | Li et al. |
| 2012/0077068 | A1 | 3/2012 | Wang et al. |
| 2012/0077079 | A1 | 3/2012 | Li et al. |
| 2012/0115069 | A1 | 5/2012 | Noack et al. |
| 2014/0199607 | A1 | 7/2014 | Li et al. |
| 2014/0234753 | A1 | 8/2014 | Li et al. |
| 2014/0248521 | A1 | 9/2014 | Chang et al. |
| 2015/0050570 | A1* | 2/2015 | Keshavarz ............... H01M 8/20 429/409 |
| 2015/0221969 | A1 | 8/2015 | Sekine et al. |
| 2015/0311541 | A1* | 10/2015 | Lloyd ................... H01M 8/188 429/508 |
| 2015/0380757 | A1 | 12/2015 | Li et al. |

FOREIGN PATENT DOCUMENTS

| | | |
|---|---|---|
| CN | 101110481 | 1/2008 |
| CN | 101213700 A | 7/2008 |
| CN | 101572319 B | 11/2009 |
| CN | 101834302 B | 9/2010 |
| CN | 102110836 A | 6/2011 |
| CN | 103975463 A | 8/2014 |
| EP | 0729648 B1 | 4/2003 |
| JP | 04019966 A | 1/1992 |
| JP | H07-758625 B2 | 6/1995 |
| JP | 2001-102080 A | 4/2001 |
| JP | 2011-102080 | 4/2004 |
| JP | 2010-086935 A | 4/2010 |
| JP | 5590513 B | 9/2014 |
| WO | WO93/06626 | 4/1993 |
| WO | WO95/12219 | 5/1995 |
| WO | WO96/35239 | 11/1996 |
| WO | WO02/095855 | 11/2002 |
| WO | WO2004/082056 | 9/2004 |
| WO | WO2006/135958 | 12/2006 |
| WO | WO2008/148148 | 12/2008 |
| WO | WO2010/094657 | 8/2010 |
| WO | WO 2013/054921 A1 | 4/2013 |
| WO | WO 2013/056175 A1 | 4/2013 |
| WO | WO 2014/203409 | 12/2014 |

OTHER PUBLICATIONS

Extended European Search Report, dated Mar. 21, 2018, in related European Patent Application No. 11831069.7, 6 pp.
Final Office Action from U.S. Patent and Trademark Office for U.S. Appl. No. 14/105,823, dated Dec. 19, 2014.
Final Office Action from U.S. Patent and Trademark Office for U.S. Appl. No. 14/815,037, dated Jun. 16, 2017.
First Examination Report, dated Oct. 25, 2019, issued in related India Patent Application No. 201737006170.
International Search Report and Written Opinion for PCT/US2011/039626, dated Mar. 22, 2012.
International Search Report and Written Opinion for PCT/US2015/054075, dated Dec. 21, 2015, 8 pp.
Li, L. et al., "A stable vanadium redox-flow battery with high energy density for large-scale energy storage," *Advanced Energy Materials*, vol. 1, No. 3 pp. 394-400 (May 2011).
Li, L. et al., "Development of High Performance Redox Flow Batteries at PNNL," 16 pages, DOE OE Program Review, San Diego, CA (Oct. 21, 2011).
Mohammadi, T. et al., "Use of polyelectrolyte for incorporation of ion-exchange groups in composite membranes for vanadium redox flow battery applications," *Journal of Power Sources*, vol. 56, No. 1, pp. 91-96 (Jul. 1995).
Notice of Non-Final Rejection from the Korean Intellectual Property Office for Korean Patent Application No. 10-2013-7010271, dated Sep. 26, 2014.
Notice of Non-Final Rejection from the Korean Intellectual Property Office for Korean Patent Application No. 10-2015-7019563, dated Feb. 23, 2017.
Notification of Reason for Refusal (translated), dated Feb. 23, 2017, issued in Korean Application No. 20157019563.
Notification of Reasons for Refusal (and English-language machine translation), dated Apr. 15, 2019, issued in related Japan Application No. 2017-518359.
Office Action from Canadian Intellectual Property Office for Canadian Patent Application No. 2,812,928, dated Mar. 21, 2017.
Office Action from Chinese Patent Office for Chinese Patent Application No. 201180046489.0, dated Oct. 24, 2014.
Office Action from Chinese Patent Office for Chinese Patent Application No. 201180046489.0, dated Jun. 4, 2015.
Office Action from Chinese Patent Office for Chinese Patent Application No. 201180046489.0, dated Dec. 11, 2015.
Office Action from European Patent Office for European Patent Application No. 11831069.7, dated Mar. 21, 2018.
Office Action from European Patent Office for European Patent Application No. 11831069.7, dated Oct. 2, 2019.
Office Action from Japanese Patent Office for Japanese Patent Application No. 2013-830141, dated Mar. 3, 2015.
Office Action from Japanese Patent Office for Japanese Patent Application No. 2013-530141, dated Mar. 29, 2016.
Office Action from U.S. Patent and Trademark Office for U.S. Appl. No. 14/105,823, dated Apr. 25, 2014.
Office Action from U.S. Patent and Trademark Office for U.S. Appl. No. 14/261,262, dated Jul. 10, 2014.
Office Action from U.S. Patent and Trademark Office for U.S. Appl. No. 14/815,037, dated Feb. 1, 2016.
Office Action, dated Jun. 16, 2017, issued in U.S. Appl. No. 14/815,037.
Office Action, dated Oct. 8, 2019, issued in Chinese Patent Application No. 201580053091.8.
Patent Examination Report from Australian Application No. 2011312833 (dated Oct. 2, 2013).
Patent Examination Report from the Australian Patent Office for Australian Patent Application No. 2011312833, dated Oct. 1, 2014.
Rahman et al., "Solubility of vanadyl sulfate in concentrated sulfuric acid solutions," Journal of Power Sources, 1998 vol. 72, No. 2, pp. 105-110.
Skyllas-Kazacos, M., et al., "Progress in Flow Battery Research and Development," Critical Reviews in Electrochemical and Solid-State Science and Technology, pp. R55-R79, vol. 158, *Journal of The Electrochemical Society*, Karachi, Pakistan (Jun. 2011).
Skyllas-Kazacos, Maria, "Novel Vanadium chloride/polyhalide redox flow battery," *Journal of Power Sources*, pp. 299-302, vol. 124, Elsevier, Sydney, Australia (Oct. 2003).
U.S. Appl. No. 12/892,698, filed May 24, 2013.
Substantive Examination Report Stage 1, dated Apr. 20, 2018, in related Indonesia Patent Application No. W00201301492, 2 pp.
Sum, E. et al., "A study of the V(II)/V(III) Redox Couple for Redox Flow Cell Applications," *Journal of Power Sources*, vol. 15, No. 2/3, pp. 179-190 (Jun. 1985).

(56) References Cited

OTHER PUBLICATIONS

Sum, E. et al., "Investigation of the V(V)/V(IV) System for Use in the Positive Half-Cell of a Redox Battery," *Journal of Power Sources*, vol. 16, pp. 85-95 (Jul. 1985).
Supplementary European Search Report from the European Patent Office, for European Patent Application No. 11831069.7, dated May 26, 2014, 10 pages.
Wang, W. et al., "A new redox flow battery using Fe-V redox couples in chloride supporting electrolyte," *Energy & Environmental Science*, vol. 4, No. 10, pp. 4068-4073 (Aug. 2011).
Warshay, Brian, et al. "Grid Storage under the Microscope: Using Local Knowledge to Forecast Global Demand," Annual Report, LRSGI-R-11-1, Lux Research, Inc., pp. 1-12 (Mar. 2012).
Zhang, J. et al., "Effects of additives on the stability of electrolytes for all-vanadium redox flow batteries," *J. Appl. Electrochem.*, vol. 41, Issue 10, pp. 1215-1221 (Oct. 2011).

* cited by examiner

ALL-VANADIUM SULFATE ACID REDOX FLOW BATTERY SYSTEM

CROSS-REFERENCE TO RELATED APPLICATION

This application is a Continuation of U.S. patent application Ser. No. 14/875,565, filed Oct. 5, 2015, issued as U.S. Pat. No. 10,673,090, which claims the benefit of the earlier filing date of U.S. Provisional Application No. 62/060,438, filed Oct. 6, 2014, each of which is incorporated by reference in its entirety herein.

ACKNOWLEDGMENT OF GOVERNMENT SUPPORT

This invention was made with government support under DE-AC0576RL01830 awarded by the U.S. Department of Energy. The government has certain rights in the invention.

FIELD

This invention concerns embodiments of an all-vanadium sulfate acid electrolyte comprising chloride ions and phosphate ions for use in a redox-flow battery system.

BACKGROUND

A redox flow battery (RFB) stores electrical energy in reduced and oxidized species dissolved in two separate electrolyte solutions. The anolyte and the catholyte circulate through a cell electrode separated by a membrane or separator. Redox flow batteries are advantageous for energy storage because they are capable of tolerating fluctuating power supplies, repetitive charge/discharge cycles at maximum rates, overcharging, overdischarging, and because cycling can be initiated at any state of charge.

However, among the many redox couples upon which redox flow batteries are based, a number of disadvantages exist. For example, many systems utilize redox species that are unstable, are highly oxidative, are difficult to reduce or oxidize, precipitate out of solution, and/or generate volatile gases. One of the main challenges confronting RFB systems is the intrinsically low energy density compared with other reversible energy storage systems such as lithium-ion batteries. With the voltage limitation of the aqueous systems, this issue is typically tackled by increasing the active species concentration in the electrolyte. However, the active species concentration is limited by the solubility and the stability of the active redox ions in the electrolyte solutions. Therefore, a need exists for RFB systems having a greater energy density.

SUMMARY

Embodiments of an all-vanadium sulfate acid flow battery system are disclosed. The system includes an anolyte comprising $V^{2+}$ and $V^{3+}$ in an aqueous supporting solution, and a catholyte comprising $V^{4+}$ and $V^{5+}$ in an aqueous supporting solution. The aqueous supporting solution for each of the anolyte and the catholyte includes sulfate ions, protons, chloride ions, and phosphate ions. The chloride ions may be provided by an inorganic chloride salt. The phosphate ions may be provided by an inorganic phosphate salt. In any or all of the above embodiments, the aqueous supporting solution may further include magnesium ions, ammonium ions, or magnesium ions and ammonium ions. In any or all of the above embodiments, [V] may be $\geq 1.0$ M in the anolyte and [V] may be $\geq 1.0$ M in the catholyte.

In any or all of the above embodiments, the aqueous supporting solution may comprise 0.05-0.5 M chloride ions. In any or all of the above embodiments, the chloride ions may be provided by $MgCl_2$. In any or all of the above embodiments, the aqueous supporting solution may comprise 0.05-0.5 M phosphate ions. In any or all of the above embodiments, the phosphate ions may be provided by ammonium phosphate. In some embodiments, the phosphate ions are provided by $(NH_4)_2HPO_4$.

In any or all of the above embodiments, the battery system may have a Mg:V molar ratio within a range of 1:100 to 1:1, a Cl:V molar ratio within a range of 1:50 to 1:2, a phosphate:V molar ratio within a range of 1:50 to 1:2, a $NH_4^+$:V molar ratio within a range of 1:50 to 1:3, a Cl:phosphate molar ratio within a range of 10:1 to 1:10, a $NH_4^+$:Mg molar ratio within a range of 60:1 to 1:5, or any combination thereof. In any or all of the above embodiments, the sulfate concentration may be 4.5-6 M.

In any or all of the above embodiments, the aqueous supporting solution may include $H_2O$, $H_2SO_4$, $MgCl_2$, and ammonium phosphate. In some embodiments, the aqueous supporting solution comprises 0.025-0.25 M $MgCl_2$ and 0.05-0.5 M ammonium phosphate.

In any or all of the above embodiments, the anolyte may comprise 1.0-2.5 M vanadium as $V^{2+}$ and $V^{3+}$, 0.025-0.5 M magnesium ions, 0.05-0.5 M chloride ions, 0.05-1.5 M ammonium ions, and 0.05-0.5 M phosphate ions, and the catholyte may comprise 1.0-2.5 M vanadium as $V^{4+}$ and $V^{5+}$, 0.025-0.25 M magnesium ions, 0.0.5-0.5 M chloride ions, 0.05-0.1.5 M ammonium ions, and 0.05-0.5 M phosphate ions. In some embodiments, the anolyte and catholyte independently comprise 0.5-0.1 M $MgCl_2$ and 0.1-0.2 M $(NH_4)_2HPO_4$.

In any or all of the above embodiments, the anolyte and catholyte may comprise, consist essentially of, or consist of a solution prepared by combining $H_2O$, $VOSO_4$—$H_2SO_4$, $MgCl_2$, and ammonium phosphate to provide 1.0-2.5 M $VOSO_4$-3.5 M $H_2SO_4$, 0.025-0.25 M $MgCl_2$, and 0.05-0.5 M ammonium phosphate. In some embodiments, the ammonium phosphate is $(NH_4)_2HPO_4$.

In any or all of the above embodiments, the system may have an operating cell temperature within a range of $-5°$ C. to $50°$ C. In any or all of the above embodiments, the system may further include an anode, a cathode, and a separator or membrane separating the anolyte and the catholyte. In some embodiments, the anode and cathode are graphite or carbon-based electrodes.

Embodiments of an anolyte and catholyte system for use in an all vanadium sulfate acid redox flow battery system include an aqueous anolyte comprising $V^{2+}$,$V^{3+}$, sulfate, magnesium ions, ammonium ions, chloride ions, and phosphate ions; and an aqueous catholyte comprising $V^{4+}$, $V^{5+}$, sulfate, magnesium ions, ammonium ions, chloride ions, and phosphate ions. In some embodiments, the anolyte and the catholyte independently comprise 0.025-0.25 M $MgCl_2$. In any or all of the above embodiments, the anolyte and the catholyte may independently comprise 0.05-0.5 M ammonium phosphate. In any or all of the above embodiments, the anolyte and catholyte system may have a Cl:V molar ratio within a range of 1:50 to 1:2 and a phosphate:V molar ratio within a range of 1:50 to 1:2.

The foregoing and other objects, features, and advantages of the invention will become more apparent from the following detailed description, which proceeds with reference to the accompanying figures.

DETAILED DESCRIPTION

Figure 1:
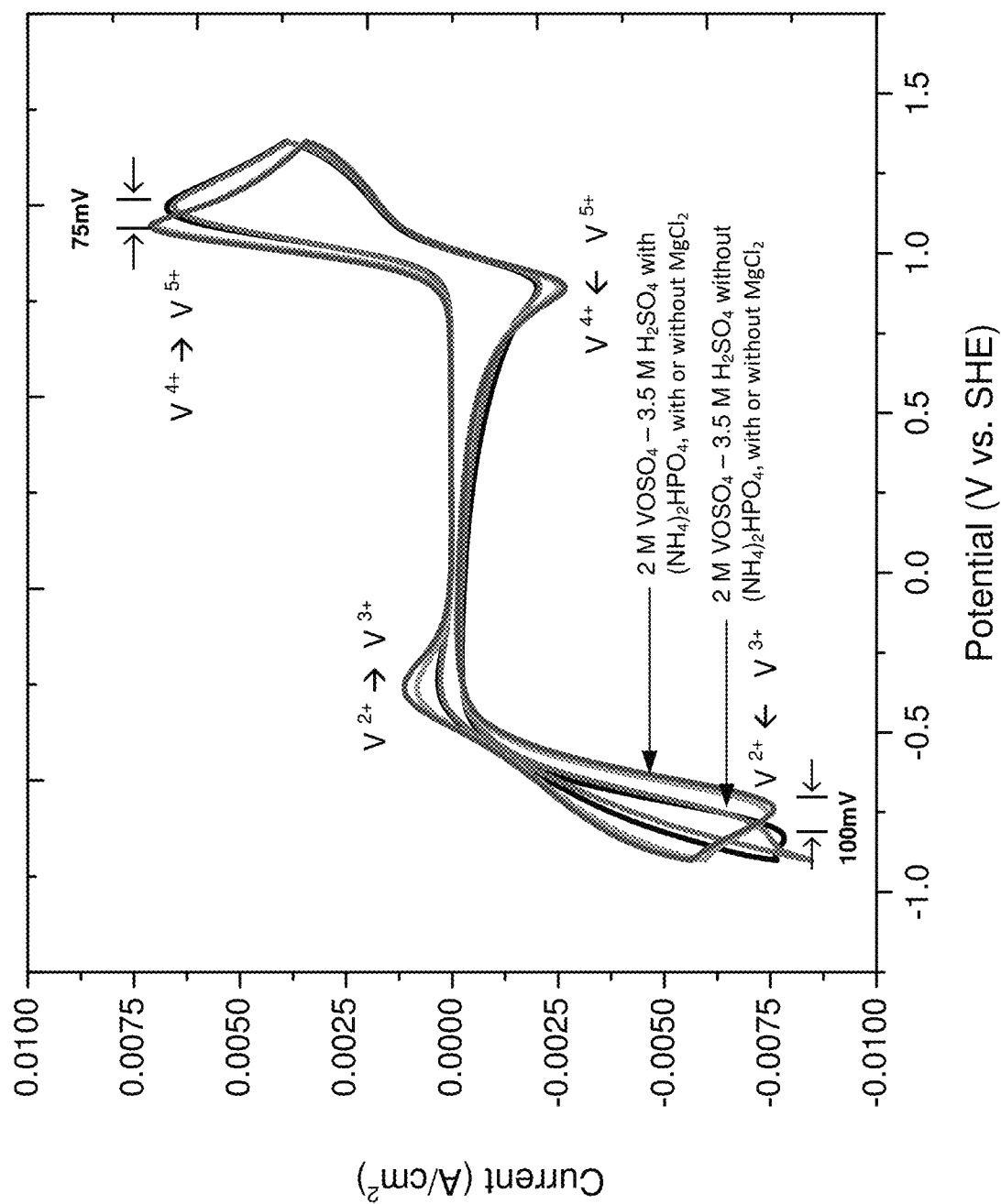
FIG. 1 is a cyclic voltammogram on a carbon electrode of electrolyte solutions containing 2 M $VOSO_4$-3.5 M $H_2SO_4$ with and without added components. The scan was carried out at room temperature at a scan rate of 50 mV/s.

Embodiments of an all-vanadium sulfate acid flow battery system are disclosed. The system includes a liquid-phase anolyte comprising $V^{2+}$ and $V^{3+}$ and a liquid-phase catholyte comprising $V^{4+}$ and $V^{5+}$. The anolyte and catholyte comprise sulfuric acid and a dual-component system to increase solubility and/or stability of the vanadium species, wherein the components comprise chloride ions and phosphate ions. The term "phosphate ions" includes $PO_4^{3-}$, $HPO_4^{2-}$, and $H_2PO_4^-$ ions, and all combinations thereof.

Embodiments of the system include a higher concentration of vanadium and/or have an increased operating temperature range compared to vanadium sulfate systems in the absence of the chloride ions and phosphate ions.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods as known to those persons of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Capacity: The capacity of a battery is the amount of electrical charge a battery can deliver. The capacity is typically expressed in units of mAh, or Ah, and indicates the maximum charge a battery can produce over a period of one hour. The specific capacity is measured with respect to either volume or weight of the active materials, which leads to the concept of specific volumetric capacity and specific gravimetric capacity, respectively.

Cell: As used herein, a cell refers to an electrochemical device used for generating a voltage or current from a chemical reaction, or the reverse in which a chemical reaction is induced by a current. Examples include voltaic cells, electrolytic cells, redox flow cells, and fuel cells, among others. Multiple single cells can form a cell assembly, often termed a stack. A battery includes one or more cells, or even one or more stacks. The terms "cell" and "battery" are used interchangeably when referring to a battery containing only one cell.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

Electrochemically active element: An element that is capable of forming redox pairs between different oxidation and reduction states, i.e., ionic species with differing oxidation states. In a flow battery, an electrochemically active element refers to the chemical species that significantly participate in the redox reaction during the charge and discharge processes contributing to the energy conversions that ultimately enable the battery to deliver/store energy. As used herein, the term "electrochemically active element" refers to an element that constitutes at least 5% of the redox active materials participating in redox reactions during battery cycling after initial charging.

Electrolyte: A substance containing free ions that behaves as an ionically conductive medium. In a redox flow battery, some of the free ions are electrochemically active elements. An electrolyte in contact with the anode, or negative half-cell, may be referred to as an anolyte, and an electrolyte in contact with the cathode, or positive half-cell, may be referred to as a catholyte. With respect to vanadium sulfate acid redox flow battery systems, the electrolyte conventionally refers to vanadium species in an aqueous sulfuric acid solution. As used herein, the terms "anolyte" and "catholyte" refer to vanadium species in an aqueous "supporting solution." The supporting solution, or supporting electrolyte, is an aqueous solution comprising sulfate ions, chloride ions, phosphate ions, protons, and other counterions introduced through added components that are not redox active. The anolyte and catholyte are often referred to as the negative electrolyte and positive electrolyte, respectively, and these terms can be used interchangeably.

Energy efficiency (EE): The product of coulombic efficiency and voltage efficiency. EE=CE×VE.

Half-cell: An electrochemical cell includes two half-cells. Each half-cell comprises an electrode and an electrolyte. A redox flow battery has a positive half-cell in which ions are oxidized, and a negative half-cell in which ions are reduced during charge. Opposite reactions happen during discharge. In an all vanadium redox flow battery, $VO^{2+}$ ions in the positive half-cell are oxidized to $VO_2^+$ ions ($V^{4+}$ oxidized to $V^{5+}$), and $V^{3+}$ ions in the negative half-cell are reduced to $V^{2+}$ ions during charge.

Proton: Hydrogen ions ($H^+$) and water-solvated hydrogen ions, e.g., $H_3O^+$, $[H_5O_2]^+$, $[H_9O_4]^+$.

Voltage efficiency: The voltage produced by the battery while discharging divided by the charging voltage

II. All-Vanadium Sulfate Acid Redox Flow Battery System

Redox flow batteries (RFBs) can provide electrical energy converted from chemical energy continuously, and are promising systems for energy storage to integrate renewable energies (e.g., solar and/or wind energy) into electrical supply grids. A RFB system comprises a positive half-cell and a negative half-cell. The half-cells are separated by a membrane or separator, such as an ion-conductive membrane or separator. The positive half-cell contains a catholyte and the negative half-cell contains an anolyte. The anolyte and catholyte are solutions comprising electrochemically active elements in different oxidation states. The electrochemically active elements in the catholyte and anolyte couple as redox pairs. During use, the catholyte and anolyte are continuously circulating through the positive and negative electrodes, respectively, where the redox reactions proceed providing the conversion between chemical energy and electrical energy or vice-versa. To complete the circuit during use, positive and negative electrodes of a RFB are electrically connected through current collectors with an external load.

Among various RFBs, the all-vanadium redox flow battery (VRFB) is currently considered one of the most promising candidates for grid scale energy storage. As those of ordinary skill in the art understand, the term "all-vanadium" means that the major redox active materials (i.e., at least 95%, at least 97%, or at least 99% of the redox active materials) participating in redox reactions during battery cycling (charging/discharging) after initial charging are vanadium ion redox pairs, i.e., $V^{2+}$, $V^{3+}$, $V^{4+}$ ($VO^{2+}$), $V^{5+}$ ($VO_2^+$). Other redox pairs may participate during initial charging of the redox flow battery.

The VRFB has several advantages such as high energy efficiency, quick response time, long lifespan, low self-discharge, no crossover issues, and low maintenance cost. However, the disadvantages of low energy density and poor stability and solubility of flow battery electrolyte solutions limit its applications.

Embodiments of the disclosed all-vanadium sulfate acid redox flow battery system have an anolyte comprising $V^{2+}$ and $V^{3+}$ in an aqueous supporting solution and a catholyte comprising $V^{4+}$ and $V^{5+}$ in an aqueous supporting solution, wherein the aqueous supporting solution comprises sulfate ions, protons, and a dual-component system comprising chloride ions and phosphate ions to stabilize and increase the solubility of the vanadium species. Without wishing to be bound by a particular theory, it appears that the combination of sulfate ions, protons, chloride ions, and phosphate ions may act synergistically to stabilize and increase solubility of the vanadium species. Suitable electrodes include graphite and/or carbon based electrodes, e.g., graphite felt, graphene, carbon felt, carbon foam electrodes, and so on. In some embodiments, the cathode and the anode are graphite electrodes. The system further includes a separator or membrane, such as an ion-conducting separator or membrane, separating the anolyte and the catholyte. The vanadium may be provided, for example, by dissolving vanadium (IV) oxide sulfate hydrate ($VOSO_4 \cdot xH_2O$) in sulfuric acid. The system is operable, without an external heat management device, over an operating temperature range of $-5°$ C. to $50°$ C. with vanadium concentrations up to 2.5 M, such as from 1.0-2 M. The flow battery system may be operated as a closed system, which advantageously prevents rapid oxidation of $V^{2+}$ and $V^{3+}$ by air and minimizes electrolyte loss.

Traditional vanadium sulfate RFB systems previously have been limited to a maximum concentration of 1.5 M vanadium in the absence of chloride, e.g., 1.5 M $VOSO_4$-3.5 M $H_2SO_4$, over an operating temperature range of $10°$ C. to $35°$ C. At greater concentrations, $V^{5+}$ species precipitate at elevated temperatures (e.g., at $50°$ C.) and $V^{4+}$ species precipitate at lower temperatures (e.g., less than $0°$ C.). For example, at concentrations >1.7 M, $V^{5+}$ has poor thermal stability at temperatures $\geq 40°$ C. $V^{2+}$ and $V^{3+}$ ions also may precipitate at lower temperatures.

The disclosed supporting solutions include a dual-component system to maintain electrolyte stability, thereby enabling increased vanadium concentration and thus the energy density of the system. In particular, the supporting solutions comprise a dual-component system that increases the solubility and stability of vanadium (IV) and vanadium (V) species. Effective components do not adversely react with the redox species, e.g., do not change the potential of redox reaction between $V^{5+}$ and $V^{4+}$, and do not react with sulfate. Effective components also are electrochemically stable over the flow battery operation voltage window. Desirably, the added components are effective at low concentrations relative to the vanadium species and sulfuric acid; high added component concentrations may exacerbate vanadium species precipitation, particularly $V^{3+}$, and/or form sulfate precipitates.

Embodiments of the disclosed supporting solutions comprise sulfate ions (e.g., provided by sulfuric acid), protons, and a dual-component system comprising chloride ions and phosphate ions. In one embodiment, the protons are hydrogen ions ($H^+$). In another embodiment, the protons are solvated hydrogen ions, e.g., $H_3O^+$, $[H_5O_2]^+$, $[H_9O_4]^+$, and combinations thereof. In an independent embodiment, the protons are a combination of $H^+$, $H_3O^+$, $[H_5O_2]^+$, and/or $[H_9O_4]^+$. The protons may be provided by sulfuric acid. The chloride ions may be provided by an inorganic chloride salt. As used herein, the term "inorganic chloride salt" refers to a salt composed of metal or ammonium cations and chloride anions. The phosphate ions may be provided by an inorganic phosphate salt. The term "inorganic phosphate salt" refers to a salt composed of metal or ammonium cations and phosphate ions ($H_2PO_4^-$, $HPO_4^{2-}$, $PO_4^{3-}$, and combinations thereof). The chloride ions and phosphate ions increase the stability and/or solubility of the vanadium species in the anolyte and catholyte.

For a number of years following the development of all-vanadium redox battery systems, those of ordinary skill in the art determined and stated, that is, the conventional wisdom and understanding was, that HCl could not be present in supporting solutions for all-vanadium redox battery systems and particularly in supporting solutions for the catholyte. For example, those of ordinary skill in the art believed that $V^{5+}$ is unstable in HCl solutions. Further, HCl is corrosive and can produce dangerous HCl vapors and $Cl_2$ vapors if overcharging, especially at higher temperatures. The inventors however, unexpectedly discovered that, in some cases, very low concentrations of chloride ion, e.g., 0.1-0.2 M, can be advantageous in stabilizing the electrolyte. The inventors also unexpectedly discovered that very low concentrations of chloride ion stabilize the anolyte and catholyte at higher temperatures, e.g., above 35° C. In a preferred embodiment of the invention, chloride ions in the disclosed supporting solutions are provided by an inorganic chloride salt. The use of an inorganic chloride salt makes the supporting solutions less corrosive than supporting solutions comprising HCl in addition to $H_2SO_4$, and also advantageously reduces system corrosion and HCl vapors within the system. Inorganic chloride salts are preferable to organic chloride salts, which can reduce $V^{5+}$ to $V^{4+}$.

Magnesium chloride, $MgCl_2$, was surprisingly found to be a particularly effective inorganic chloride salt. Without wishing to be bound by a particular theory, $Mg^{2+}$ ions may further augment stability of the vanadium species. Although calcium chloride may be a more effective anti-freezing agent with respect to vanadium, calcium can react with sulfate to form precipitated calcium sulfate. In some embodiments, the supporting solution includes 0.05-0.1 M $MgCl_2$, thereby providing 0.1-0.2 M chloride ions.

While inorganic chloride salts are effective at higher temperatures within the redox flow battery's operating temperature range, inorganic chloride salts may not sufficiently stabilize the vanadium species at lower temperatures, e.g., less than 10° C. Thus, it is beneficial to include a second added component that stabilizes the anolyte and catholyte at low temperatures. Phosphate ions were found to stabilize the electrolytes at low temperatures and increase the solubility of vanadium (IV) species. In some embodiments, the supporting solution comprises 0.1-0.2 M phosphate ions. Phosphate ions may be provided by an inorganic phosphate salt. In some embodiments, phosphate ions are provided by ammonium phosphate. As used herein, the term "ammonium phosphate" refers to $(NH_4)H_2PO_4$, $(NH_4)_2HPO_4$, $(NH_4)_3PO_4$, and combinations thereof. In certain examples, phosphate ions were provided by ammonium hydrogen phosphate (ammonium phosphate dibasic), $(NH_4)_2HPO_4$.

Cyclic voltammetry showed that $MgCl_2$ and $(NH_4)_2HPO_4$ do not react with the vanadium species (see, e.g., FIG. 1). $MgCl_2$ did not noticeably affect the scans. However, $(NH_4)_2HPO_4$ was found to have a catalytic effect, providing higher peak currents of electrolyte with positive scanning from $V^{4+}$ to $V^{5+}$ and $V^{5+}$ to $V^{4+}$. Furthermore, the peak voltage for $V^{4+}$ to $V^{5+}$ was shifted 75 mV, indicating that $(NH_4)_2HPO_4$ facilitates the oxidation. On the negative side, presence of $(NH_4)_2HPO_4$ shifted the peak voltage 100 mV and produced peak currents that were wider and higher, indicating that $(NH_4)_2HPO_4$ increases redox activity in the anolyte.

When the anolyte and catholyte include the dual-component system comprising chloride ions and phosphate ions, the anolyte and catholyte may independently have a total vanadium concentration (i.e., $V^{2+}/V^{3+}$, $V^{4+}/V^{5+}$) greater than 1.0 M, such as within the range of 1.0-2.5 M, 1.5-2.5 M, or 1.5-2.0 M. Increasing the vanadium concentration correspondingly increases the energy capacity of the system. In some examples, the total vanadium concentration in each of the anolyte and the catholyte is 2 M, an increase of 33% compared to vanadium-sulfate systems without the disclosed dual-component system comprising chloride ions and phosphate ions, thereby providing an increased energy capacity of 33%. A vanadium-sulfate redox flow battery system without the disclosed dual-component system and having a total vanadium concentration of 1.5 M has an energy density of 20.1 Wh/L, based on theoretical voltage and 80% of state of charge (SOC). In contrast, a vanadium-sulfate redox flow battery system with the disclosed dual-component system and having a total vanadium concentration of 2 M has an energy density of 26.8 Wh/L, based on theoretical voltage and 80% SOC.

The cell reactions during battery charge/discharge cycling, after initial charging, are as shown below for a standard vanadium sulfate redox flow battery and a redox flow battery as disclosed herein:

At the negative electrode of a vanadium sulfate RFB:

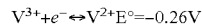

$$V^{3+}+e^-\leftrightarrow V^{2+} E°=-0.26V$$

At the positive electrode of a vanadium sulfate RFB:

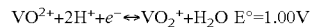

$$VO^{2+}+2H^++e^-\leftrightarrow VO_2^++H_2O\ E°=1.00V$$

Embodiments of the disclosed all vanadium sulfate redox flow battery systems include an anolyte aqueous supporting solution and a catholyte aqueous supporting solution that comprise sulfate, chloride ions, and phosphate ions. The anolyte aqueous supporting solution and catholyte aqueous supporting solution may further comprise magnesium ions, ammonium ions, or magnesium and ammonium ions. The anolyte further comprises $V^{2+}$ and $V^{3+}$ under battery charge/discharge conditions. The catholyte further comprises $V^{4+}$ and $V^{5+}$ under battery discharge/discharge conditions.

In some embodiments, the anolyte aqueous supporting solution and catholyte aqueous supporting solution independently comprise 0.05-0.5 M, such as 0.1-0.2 M, chloride ions provided by an inorganic chloride salt. The inorganic chloride salt may be $MgCl_2$. In some embodiments, the anolyte aqueous supporting solution and catholyte aqueous supporting solution independently comprise 0.05-0.5 M, such as 0.1-0.2 M, phosphate ions. Phosphate ions may be provided by an inorganic phosphate salt. In some embodiments, the phosphate salt is ammonium phosphate, e.g., ammonium phosphate dibasic.

In some embodiments, the anolyte and catholyte supporting solutions independently comprise, or consist essentially of, $H_2O$, $H_2SO_4$, magnesium ions, chloride ions, ammonium ions, and phosphate ions. In an independent embodiment, the anolyte and catholyte independently comprise, or consist essentially of, $H_2O$, $VOSO_4$, $H_2SO_4$, $MgCl_2$, and ammonium phosphate. As used herein, "consists essentially of" means that the electrolyte includes no other components that materially affect battery performance. The electrolyte may include components that do not materially affect battery performance during charging/discharging, for example, non-electrochemically active species such as alkali metal cations. The anolyte and catholyte may independently comprise, or consist essentially of, $H_2O$, $VOSO_4$, $H_2SO_4$, 0.025-0.25 M $MgCl_2$, and 0.05-0.5 M ammonium phosphate. In some embodiments, the anolyte and catholyte may independently comprise, or consist essentially of, $H_2O$, $VOSO_4$, $H_2SO_4$, 0.05-0.1 M $MgCl_2$, and 0.1-0.2 M ammonium phosphate. In an independent embodiment, the anolyte and catholyte consist of $H_2O$, $VOSO_4$, $H_2SO_4$, $MgCl_2$, and ammonium phosphate. The anolyte and catholyte may independently consist of $H_2O$, $VOSO_4$, $H_2SO_4$, 0.025-0.25 M $MgCl_2$, and 0.05-0.5 M ammonium phosphate. In some embodiments the anolyte and catholyte independently consist of $H_2O$, $VOSO_4$, $H_2SO_4$, 0.05-0.1 M $MgCl_2$, and 0.1-0.2 M ammonium phosphate. The ammonium phosphate may be $(NH_4)_2HPO_4$.

In some embodiments, during battery charge/discharge, the anolyte has a total [V]≥1.0 M as $V^{2+}$ and $V^{3+}$, and the catholyte has a total [V]≥1.0 M as $V^{4+}$ (e.g., $VO^{2+}$) and $V^{5+}$ (e.g., $VO_2^+$). The anolyte and catholyte may independently have a total concentration of 1.0-2.5 M vanadium or 1.5-2.5 M vanadium, such as a concentration of 2 M vanadium.

In one embodiment, the anolyte and catholyte independently have a Cl:V molar ratio within a range of 1:50 to 1:2, such as from 1:25 to 1:4, or from 1:20 to 1:10. In some examples, the Cl:V molar ratio was 1:20.

In an independent embodiment, the anolyte and catholyte independently have a phosphate:V molar ratio within a range of 1:50 to 1:2, such as from 1:25 to 1:4, or from 1:20 to 1:10. In some examples, the phosphate:V molar ratio was 1:13.

In an independent embodiment, the anolyte and catholyte independently have a Mg:V molar ratio within a range of 1:100 to 1:1, such as 1:50 to 1:8, or from 1:40 to 1:20. In some examples, the Mg:V molar ratio was 1:40.

In an independent embodiment, the anolyte and catholyte independently have a $NH_4^+$:V molar ratio within a range of 1:50 to 1:3, such as from 1:25 to 1:1.3, or from 1:10 to 1:5. In some examples, the $NH_4^+$:V molar ratio was 1:6.7.

In an independent embodiment, the anolyte and catholyte independently have a $Cl:SO_4$ molar ratio within a range of 1:120 to 1:9, such as from 1:60 to 1:25, or 1:55 to 1:35. In some examples, the $Cl:SO_4$ molar ratio was 1:55.

In an independent embodiment, the anolyte and catholyte independently have a phosphate:$SO_4$ molar ratio within a range of 1:120 to 1:9, such as from 1:60 to 1:25, or 1:50 to 1:25. In some examples, the phosphate:$SO_4$ molar ratio was 1:37 or 1:27.

In an independent embodiment, the anolyte and catholyte independently have a Cl:phosphate molar ratio within a range of 10:1 to 1:10, such as from 5:1 to 1:5, from 2:1 to 1:2, or from 1:1 to 1:2. In some examples, the Cl:phosphate molar ratio was 1:1.5.

In an independent embodiment, the anolyte and catholyte independently have a $NH_4^+$:Mg molar ratio within a range of 60:1 to 1:5, such as from 12:1 to 1:1, or from 8:1 to 4:1. In some examples, the $NH_4^+$:Mg molar ratio was 6:1 or 8:1.

In an independent embodiment, the anolyte and catholyte independently have a Mg:Cl molar ratio of 1:2.

In an independent embodiment, the anolyte and catholyte independently have a $NH_4^+$:phosphate molar ratio within a range of 3:1 to 1:1, such as from 2.5:1 to 1.5:1. In some examples, the $NH_4^+$:phosphate molar ratio was 2:1.

In an independent embodiment, the anolyte and catholyte independently comprise, consist essentially of, or consist of a solution prepared by combining $H_2O$, $VOSO_4$—$H_2SO_4$, a magnesium ion source, a chloride ion source, an ammonium ion source, and a phosphate ion source to provide 1.0-2.5 M vanadium, 4.5-6 M $SO_4^{2-}$, 0.025-0.25 M $Mg^{2+}$, 0.05-0.5 M $Cl^-$, 0.05-1.5 M $NH_4^+$, and 0.05-0.5 M phosphate. The anolyte and catholyte may independently comprise, consist essentially of, or consist of a solution prepared by combining $H_2O$, $VOSO_4$—$H_2SO_4$, a magnesium ion source, a chloride ion source, an ammonium ion source, and a phosphate ion source to provide 1.0-2.5 M vanadium, 4.5-6 M $SO_4^{2-}$, 0.05-0.1 M $Mg^{2+}$, 0.1-0.2 M $Cl^-$, 0.1-0.6 M $NH_4^+$, and 0.1-0.2 M phosphate. Suitable ion sources may include, but are not limited to, $MgCl_2$, $(NH_4)_2HPO_4$, $(NH_4)H_2PO_4$, $(NH_4)_3PO_4$, $Mg(OH)_2$, HCl, $NH_4OH$, $H_3PO_4$, $NH_4Cl$, $MgHPO_4$, $Mg(H_2PO_4)_2$, $Mg_3(PO_4)_2$, and $NH_4MgPO_4$.

In an independent embodiment, the anolyte and catholyte independently comprise, consist essentially of, or consist of a solution prepared by combining $H_2O$, $VOSO_4$—$H_2SO_4$, $MgCl_2$, and ammonium phosphate to provide 1.0-2.5 M vanadium, 4.5-6 M $SO_4^{2-}$, 0.025-0.25 M $MgCl_2$, and 0.05-0.5 M ammonium phosphate. The anolyte and catholyte may independently comprise, consist essentially of, or consist of a solution prepared by combining $H_2O$, $VOSO_4$—$H_2SO_4$, $MgCl_2$, and ammonium phosphate to provide 1.0-2.5 M vanadium, 4.5-6 M $SO_4^{2-}$, 0.05-0.1 M $MgCl_2$, and 0.1-0.2 M ammonium phosphate or 0.15-2 M ammonium phosphate. The ammonium phosphate may be $(NH_4)_2HPO_4$. In some examples, the anolyte and catholyte comprise 2 M vanadium, 5.5 M $SO_4^{2-}$, 0.05 M $MgCl_2$, and 0.15 M $(NH_4)_2HPO_4$.

Embodiments of the disclosed all vanadium sulfate acid redox flow battery systems are operable over a temperature range from −5° C. to 50° C. and a current density range from 1 mA/cm² to 1000 mA/cm². In some embodiments, the disclosed systems are operable over a temperature range from −5° C. to 50° C. with a coulombic efficiency >90%, such as >95% or >97% at a current density from 10 mA/cm² to 320 mA/cm². The disclosed systems have an energy efficiency and a voltage efficiency >75%, >80%, or >85% over the operating temperature range at a current density from 10 mA/cm² to 320 mA/cm². Coulombic, energy, and/or voltage efficiency may depend at least in part on other parameters, such as flow field, pump rate, etc.

At −5° C., embodiments of the disclosed all vanadium sulfate redox flow battery systems including 2 M $VOSO_4$-3.5 M $H_2SO_4$, 0.1-0.2 M Cl— provided by an inorganic chloride salt, and 0.1-0.2 M phosphate ions have a charge capacity and discharge capacity greater than 1.2 Ah, a charge energy greater than 2 Wh, and a discharge energy greater than 1.6 Wh over at least 75 cycles. In such embodiments, the voltage efficiency and energy efficiency is greater than 80%, with a coulombic efficiency greater than 95%. At 50° C., the same systems have a charge capacity and discharge capacity from 1.8-2.2 Ah, a charge energy from 2.9-3.2 Wh, and a discharge energy from 2.7-3 Wh over at least 25 cycles. The voltage and energy efficiencies are greater than 85%, with a coulombic efficiency greater than 95%. Over the operating temperature range of −5° C. to 50° C. and a current density range from 1 mA/cm² to 1000 mA/cm², the coulombic, energy, and voltage efficiencies of the disclosed systems remain substantially constant (i.e., varying by less than 5%) over at least 25 cycles, at least 50 cycles, at least 70 cycles, or at least 80 cycles (see, e.g., FIGS. 3 and 5). Charge and discharge capacities also remain substantially constant (see, e.g., FIGS. 2 and 4).

In some examples where the electrolytes included 2 M vanadium, 5.5 M sulfate, 0.05 M $MgCl_2$, and 0.15 M $(NH_4)_2HPO_4$, the coulombic efficiency was 97-99% and the energy efficiency was 80-89% over the temperature range from −5° C. to 50° C. at a current density of 50 mA/cm². The charge and discharge capacities were 1.3-2.2 Ah, the charge energy was 2-3.2 Wh, and the discharge energy was 1.7-2.7 Wh.

III. Examples

Materials and Methods

Vanadium sulfate was purchased from Noah Technology. All other chemicals were purchased from Sigma-Aldrich.

Solution Preparation and Stability Testing

The $V^{4+}$ electrolyte solutions were prepared by dissolving $VOSO_4 \cdot xH_2O$ in sulfuric acid aqueous solutions. The electrolyte solutions containing $V^{2+}$, $V^{3+}$ and $V^{5+}$ cations were prepared electrochemically by charging the $V^{4+}$ solutions in a flow cell. The stability evaluations were carried out at a temperature range of −5 to 50° C. in a temperature-controlled bath. For the added component effect study, a known amount of each added component (i.e., chloride, phosphate) was added into the electrolyte solutions before starting the stability evaluations. All the stability tests were carried out statically without any stirring or shaking. During the evaluation, each sample was scanned once a day for precipitation and solution color change. The concentrations of electrolyte solution were analyzed by inductively coupled plasma/atomic emission spectrometry (ICP/AES, Optima 7300DV, Perkin Elmer) techniques after appropriate dilution. Three emission lines were chosen for each element as a crosscheck for spectral interference. The calibration standards were matrix-matched in water.

Flow Cell Test of 2 M Vanadium Sulfate Acid Electrolyte Solution with Mixture of $(NH_4)_2HPO_4$ and $MgCl_2$ as Added Components The flow cell tests were conducted at 50, 25 and −5° C. respectively in a single flow cell with graphite plates as positive and negative current collectors. Graphite felt ("GFD5", SGL Carbon group, Germany) was employed as both positive and negative electrodes, with geometrical area of 10 cm$^2$ and heat treatment at 400° C. in air for 6 h. A Nafion® 115 membrane (perfluorosulfonic acid/PTFE copolymer in the acid form) soaked in deionized water was used as a separator in the flow cell. The electrolyte solutions containing 2 M $V^{4+}$ ion with 0.15 M $(NH_4)_2HPO_4$ and 0.05 M $MgCl_2$ in 5.5 M $H_2SO_4$ were employed and the flow rate was fixed at 20 mL/min. Charging was conducted at 50 mA/cm$^2$ to 1.6 voltage (80% SOC) and discharged to 0.8 voltage with the same current density. To keep the charge balance at positive and negative sides, the $V^{5+}$ solution (ca. 100% SOC) at positive side after the first charge process was replaced by the original $V^{4+}$ solution with the same volume. Cycling test was performed to investigate capacity degradation and durability of the electrolyte 2 M $VOSO_4$-3.5 M $H_2SO_4$-0.15 M $(NH_4)_2HPO_4$ and 0.05 M $MgCl_2$. Both the flow cell and electrolyte reservoirs are inside an environment chamber (Thermal Product Solution, White Deer, Pa.) maintained at −5° C. during the test.

Example 1

Stability of all-Vanadium Sulfate Acid Electrolytes without Added Components

The highest concentration of all-vanadium sulfate acid electrolyte solution was 1.5 M over the operating temperature range of −5 to 50° C. as shown in Table 1. As shown in Table 1, species of $V^{4+}$ and $V^{5+}$ easily precipitated out from electrolyte solutions.

TABLE 1

Stability of $V^{n+}$ sulfate acid solutions

| $V^{n+}$ Species | $V^{n+}$, M | Total Sulfate, M | T, ° C. | Time to precipitation |
|---|---|---|---|---|
| $V^{3+}$ | 2.0 | 5.5 | −5 | Stable >10 days |
|  | 2.0 | 5.5 | 25 | Stable >10 days |

TABLE 1-continued

Stability of $V^{n+}$ sulfate acid solutions

| $V^{n+}$ Species | $V^{n+}$, M | Total Sulfate, M | T, ° C. | Time to precipitation |
|---|---|---|---|---|
|  | 2.0 | 5.5 | 40 | Stable >10 days |
|  | 2.0 | 5.5 | 50 | Stable >10 days |
| $V^{4+}$ | 2.0 | 5.5 | −5 | *Stable <18 hours* |
| ($VO^{2+}$) | *2.0* | *5.5* | *25* | *Stable <95 hours* |
|  | 2.0 | 5.5 | 40 | Stable >10 days |
|  | 2.0 | 5.5 | 50 | Stable >10 days |
| $V^{5+}$ | 2.0 | 5.5 | −5 | Stable >10 days |
| ($VO_2^+$) | 2.0 | 5.5 | 25 | Stable >10 days |
|  | *2.0* | *5.5* | *40* | *Stable <95 hours* |
|  | *2.0* | *5.5* | *50* | *Stable <18 hours* |
|  | 1.5 | 5.0 | 50 | Stable >10 days |

(Italicized data shows the conditions and times at which the indicated species precipitated.)

Example 2

Stability of all-Vanadium Sulfate Acid Electrolytes with Added Components

Inorganic salt anti-freezing components were chosen because organic salts could react with $V^{5+}$ species and reduce $V^{5+}$ species to $V^{4+}$ which is unsuitable for the all-vanadium flow battery system. To determine the best added components for the all-vanadium sulfate acid flow battery system, especially to improve the stability of $V^{4+}$ and $V^{5+}$ species, several inorganic salts were evaluated as shown in Table 2.

TABLE 2

Salts

| Chemical Name | Formula | Lowest Practical Temp. ° C. |
|---|---|---|
| Calcium Chloride | $CaCl_2$ | −29 |
| Magnesium Chloride | $MgCl_2$ | −15 |
| Potassium Acetate | $KC_2H_3O_2$ | −9 |
| Lithium Chloride | $LiCl$ |  |
| Ammonium Acetate | $NH_4C_2H_3O_2$ |  |
| Sodium Chloride | $NaCl$ | −9 |
| Ammonium Sulfate | $(NH_4)_2SO_4$ | −7 |
| Urea | $NH_2CONH_2$ | −7 |
| Ammonium Phosphate Dibasic | $(NH_4)_2HPO_4$ |  |
| Ammonium Phosphate Monobasic | $NH_4H_2PO_4$ |  |
| Ammonium Chloride | $NH_4Cl$ |  |
| Sodium Sulfate | $Na_2SO_4$ |  |

The added salts were evaluated at temperatures ranging from −5 to 50° C. The best salts were mixtures of ammonium phosphate dibasic and magnesium chloride, which could stabilize all vanadium species of $V^{3+}$, $V^{4+}$ and $V^{5+}$ in a sulfate acid system. Although calcium chloride is a more efficient anti-freezing agent, calcium ions could react with sulfate acid to form undissolved calcium sulfate. Other anti-freezing agents or salts were either not strong enough to stabilize the $V^{3+}$, $V^{4+}$ and/or $V^{5+}$ at temperature range of −5 to 50° C. or could react with sulfate acid to form undissolved salts. Ammonium phosphate dibasic and magnesium chloride individually were not strong enough to stabilize all the four vanadium species.

As shown in Table 1, $V^{3+}$ is stable at temperatures ranging from −5 to 50° C. However, any added salt could cause precipitation in highly concentrated electrolyte solutions.

Therefore it is preferable to include minimal concentrations of added salts to avoid precipitation of $V^{3+}$. For chloride based salts, it has been shown that chloride ion can stabilize $V^{5+}$ species in electrolyte solution (Li et al., *Advanced Energy Materials* 2011, 1:394-400). However, the stability studies showed that chloride ion did not improve the solubility of $V^{4+}$ species. It also was demonstrated that ammonium phosphate dibasic did not improve the solubility and stability of $V^{5+}$ electrolyte, but was a good salt for stabilizing $V^{4+}$ species. The test results for all vanadium sulfate acid electrolytes with different salts are shown in Table 3.

TABLE 3

Stability of $V^{n+}$ sulfate acid solutions with salts

| V (M) | $SO_4^{2-}$(M) | Composition | Temperature ° C. | Salt | Time to precipitate |
|---|---|---|---|---|---|
| 2.0 | 5.5 | $V^{5+}$ | 50, 40, 0, −5, −10, −15 | Blank | <4 days |
|  |  | $V^{4+}$ | 50, *0, −5, −10, −15* |  | <4 days |
|  |  | $V^{3+}$ | 50, 0, −5, −10, −15 |  | ≥48 days |
| 2.0 | 5.5 | $V^{5+}$ | 50, 40, 0, −5, −10, −15 | 0.05M $MgCl_2$ | *<1 day* |
|  |  | $V^{4+}$ | 50, *0, −5, −10, −15* |  | <5 days |
|  |  | $V^{3+}$ | *50, 0, −5, −10, −15* |  |  |
| 2.0 | 5.5 | $V^{5+}$ | 50, 40, 0, *−5, −10* | 0.15M | <2 days |
|  |  | $V^{4+}$ | 50, *0, −5, −10* | $(NH_4)_2HPO_4$ | <8 days |
|  |  | $V^{3+}$ | 50, 0, −5, −10, −15 |  |  |
| 2.0 | 5.5 | $V^{5+}$ | 50, 40, 25, 0, −5 | 0.1M | ≥14 (50, 40° C.) days |
|  |  | $V^{4+}$ | 50, 0, −5 | $(NH_4)_2HPO_4$ | ≥12 (−5° C.) days |
|  |  | $V^{3+}$ | 50, 0, −5, −10 | 0.1M $MgCl_2$ | >60 days |
| 2.0 | 5.5 | $V^{5+}$ | 50, 40, 25, 0, −5 | 0.15M | ≥21 (50, 40° C.) days |
|  |  | $V^{4+}$ | 50, 0, −5 | $(NH_4)_2HPO_4$ | ≥20 (−5° C.) days |
|  |  | $V^{3+}$ | 50, 0, −5, −10, −15 | 0.05M $MgCl_2$ | ≥41 days(50° C.) |
| 2.0 | 5.5 | $V^{5+}$ | 50, 40, 25, 0, −5 C. | 0.2M | ≥21 days(50, 40° C.) |
|  |  | $V^{4+}$ | 50, 0, −5, −10, −15 C. | $(NH_4)_2HPO_4$ | ≥22 days(0° C.) |
|  |  | $V^{3+}$ | 50, 0, −5, −10 C. | 0.05M $MgCl_2$ | ≥21 (50° C.) days |

(Italicized data shows the temperatures and times at which the indicated species precipitated.)

The results demonstrated that a mixture of $(NH_4)_2HPO_4$ and $MgCl_2$ could stabilize 2 M all-vanadium sulfate electrolytes. Mixtures of 0.15 or 0.2 M $(NH_4)_2HPO_4$ and 0.05 M $MgCl_2$ were able to stabilize 2 M all-vanadium sulfate electrolytes for more than 20 days at a temperature range from −5 to 50° C.

Example 3

Properties and Performance of all-Vanadium Sulfate Acid Electrolyte Solutions with $(NH_4)_2HPO_4$ and $MgCl_2$ Electrochemical properties of the all vanadium mixed acid electrolyte with and without added salts were investigated using the cyclic voltammogram (CV) method. The CV scan of 2.0 M $VOSO_4$ and 3.5 M $H_2SO_4$ electrolyte with and without 0.15 M $(NH_4)_2HPO_4$ and 0.05 M $MgCl_2$ are shown in FIG. 1.

As shown in FIG. 1, both ammonium phosphate dibasic and magnesium chloride were unreactive with the vanadium species. The CV scans of 2 M $VOSO_4$-3.5 M $H_2SO_4$ electrolyte with and without 0.05 M $MgCl_2$ were almost identical, indicating that magnesium chloride does not react with vanadium species at all. As shown, however, ammonium phosphate dibasic had a catalytic effect on both positive and negative electrolytes. When positive scanning from $V^{4+}$ to $V^{5+}$ and from $V^{5+}$ to $V^{4+}$, both the peak currents of electrolyte with ammonium phosphate dibasic were higher than that of electrolyte without ammonium phosphate dibasic. Also the peak voltage was shifted 75 mV from 1.15V to 1.075V when scanning from $V^{4+}$ to $V^{5+}$, indicating ammonium phosphate dibasic can help $V^{4+}$ to $V^{5+}$ transfer. For negative side electrolytes, the peak voltage was shifted about 100 mV from −0.835V to −0.735V and the peak currents were much wider and higher than that without ammonium phosphate dibasic electrolytes. The results indicated that ammonium phosphate dibasic not only can improve the stability and solubility of electrolytes, but also can increase the activity of redox reaction of electrolytes.

Figure 2:
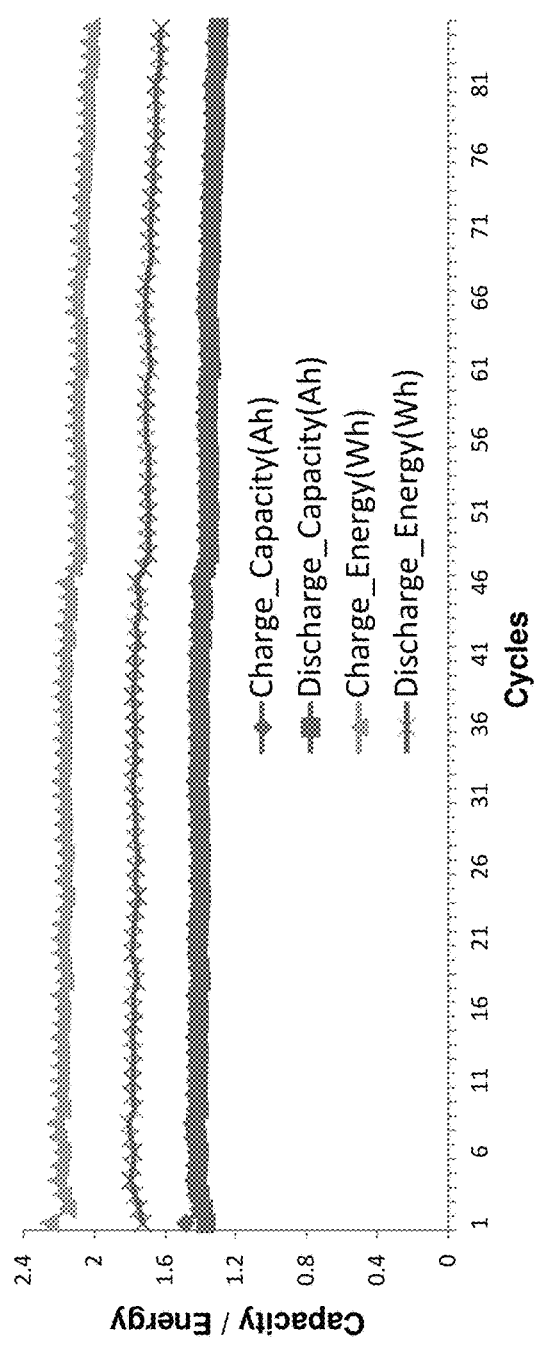
FIG. 2 is a graph showing the charge capacity, discharge capacity, charge energy, and discharge energy of an embodiment of the all vanadium sulfate acid electrolyte with 0.15 M $(NH_4)_2HPO_4$ and 0.05 M $MgCl_2$ as a function of the number of cycles at −5° C.
Figure 4:
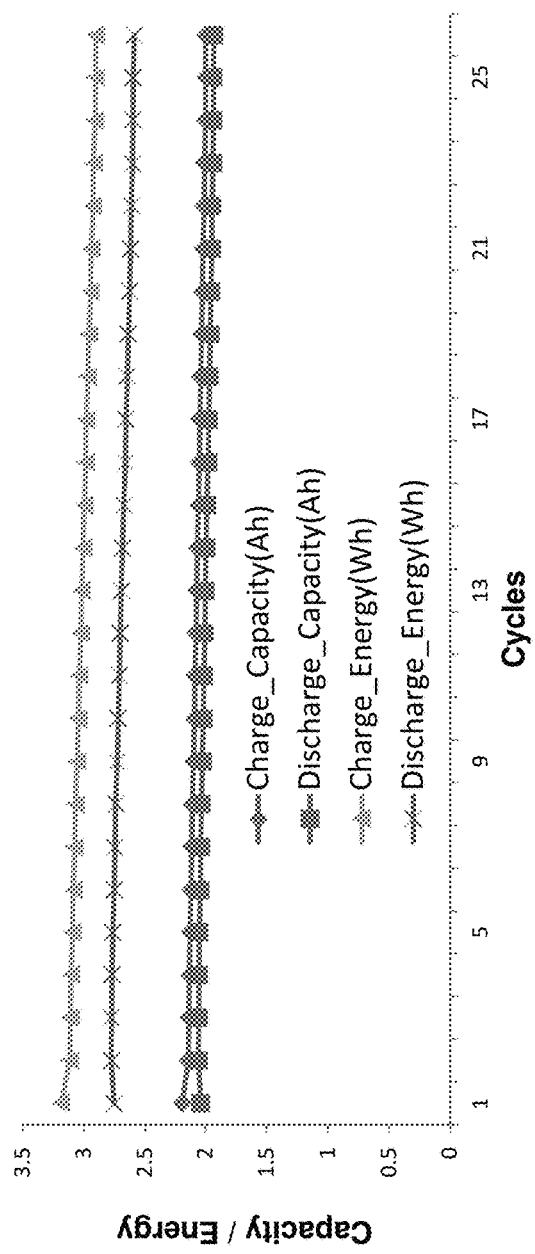
FIG. 4 is a graph showing the charge capacity, discharge capacity, charge energy, and discharge energy of an embodiment of the all vanadium sulfate acid electrolyte with 0.15 M $(NH_4)_2HPO_4$ and 0.05 M $MgCl_2$ as a function of the number of cycles at 50° C.

The cell performance of the all vanadium sulfate acid electrolyte solution was evaluated in a single RFB cell. As shown in FIGS. 2 and 4, charge capacity, discharge capacity, charge energy, and discharge energy remained substantially constant for at least 80 cycles at −5° C. and for at least 25 cycles at 50° C.

Figure 3:
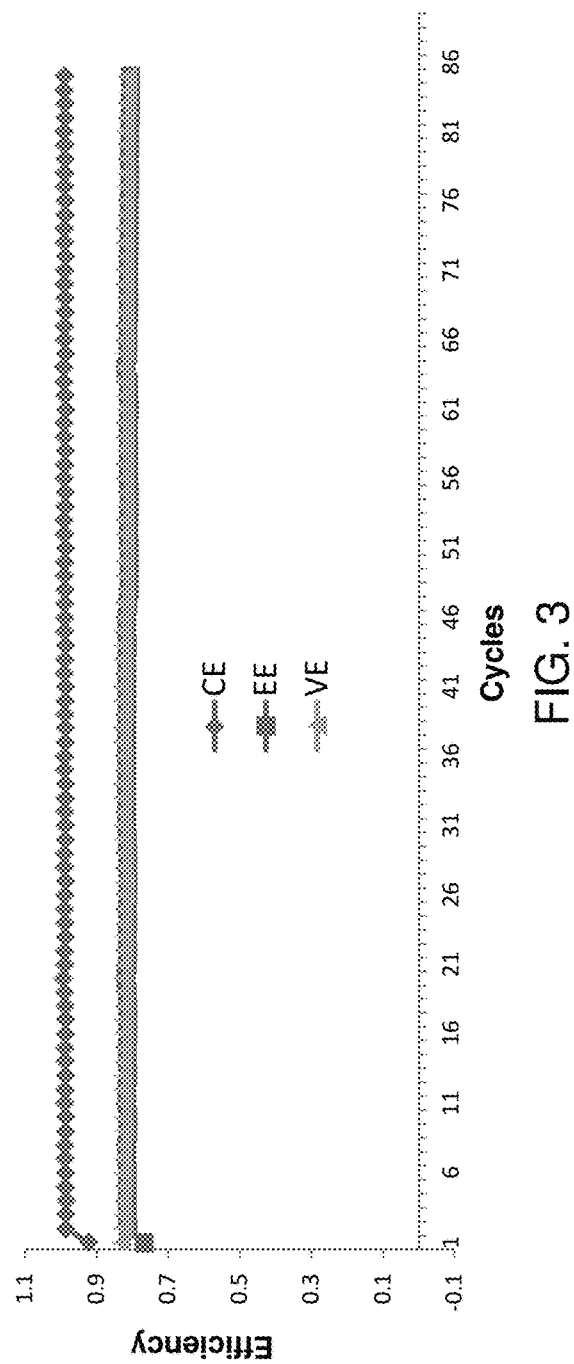
FIG. 3 is a graph showing the coulombic efficiency (CE), energy efficiency (EE), and voltage efficiency (VE) of an embodiment of the all vanadium sulfate acid electrolyte with 0.15 M $(NH_4)_2HPO_4$ and 0.05 M $MgCl_2$ as a function of the number of cycles at −5° C.
Figure 5:
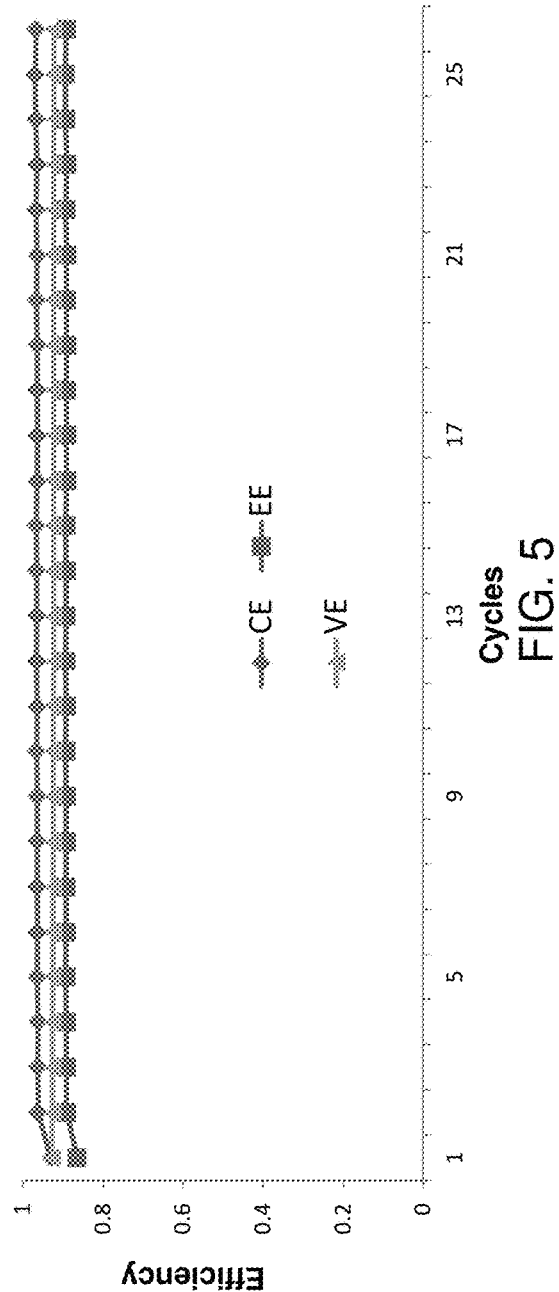
FIG. 5 is a graph showing the coulombic efficiency (CE), energy efficiency (EE), and voltage efficiency (VE) of an embodiment of the all vanadium sulfate acid electrolyte with 0.15 M $(NH_4)_2HPO_4$ and 0.05 M $MgCl_2$ as a function of the number of cycles at 50° C.

As shown in FIGS. 3 and 5, respectively the columbic efficiency was 99% at −5° C. and 97% at 50° C. Energy efficiency was 80% at −5° C. and 89% at 50° C.; and voltage efficiency was about 80%. Voltage efficiency was similar to energy efficiency.

Example 4

Vanadate Solvate Structures

Figure 6A:
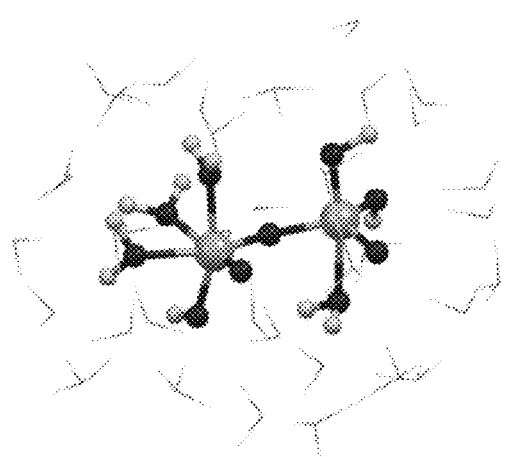
FIGS. 6A and 6B are molecular models showing optimized DFT (density functional theory) configurations for $[V_2O_3(H_2O)_7]^{4+}$ (FIG. 6A) and $[VO_2Mg(H_2O)_9]^{3+}$ (FIG. 6B) solvates; $H_2O$ and $H_3O^+$ solvation molecules are shown in stick images.

Understanding vanadate solvation structures facilitates rational design of redox flow battery electrolytes. Vanadium solvate structures were analyzed using density functional theory (DFT)-based calculations with the NWchem 6.1 package (developed and maintained by the Environmental Molecular Science Laboratory, at Pacific Northwest National Laboratory, Richland, Wash.; Valiev et al., *Comput Phys. Commun.* 2010, 181:1477). All of the calculations were done at the B3LYP theory level with dispersion correction (D3) using the 6-31G** (all-electron valence double zeta with polarization function) Gaussian-type basis set without any geometrical constraints. To capture the solvent ensemble effect, COSMO (an implicit solvent model) was employed with dielectric constant (E) of 29.8 to represent the 5 M sulfuric acid solution. Initially, the $V^{5+}$ based solvates with water molecules alone were analyzed with COSMO model. For the global energy minimum structures, explicit solvent molecules (both $H_2O$ and $H_3O^+$) were evenly spread over the $V^{5+}$ based solvates and subsequently treated with COSMO based solvation model (FIG. 6A). This cluster model approach with layers of explicit and implicit solvent molecules represents the highly acidic environment within the electrolyte system.

The vanadate solvate structure (FIG. 6A) revealed that the water molecule bonded with metal cation, i.e., $[V_2O_3(H_2O)_7]^{4+}$, is prone to losing a proton due to its electrostatic interaction with the metal center even under highly acidic conditions (represented by $H_3O^+$ ions). The relatively higher electronegativity of the vanadate cation leads to transfer of electron density from the molecular orbital of the water molecules to the empty orbitals of the metal cation. This charge transfer weakens the O—H bond in the coordinated water molecules and makes it more acidic, leading to proton loss and subsequently hydroxo-species which are prone to hydrolysis-based polymerization leading to $V_2O_5$ precipitation. Although the proton loss can be controlled by temperature and pH of the solvent system, the higher charge cations (Z≥4+) could still be susceptible to proton loss. Hence it is advantageous to counter the initial proton loss through addition of suitable added components, which can disrupt the hydrolysis-based polymerization by coordinating directly with the vanadate solvate structure.

Figure 6B:
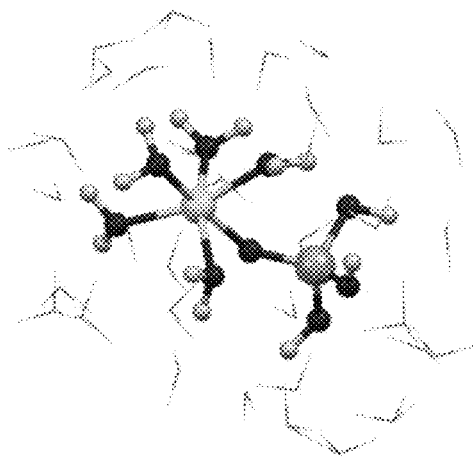
Figure 7:
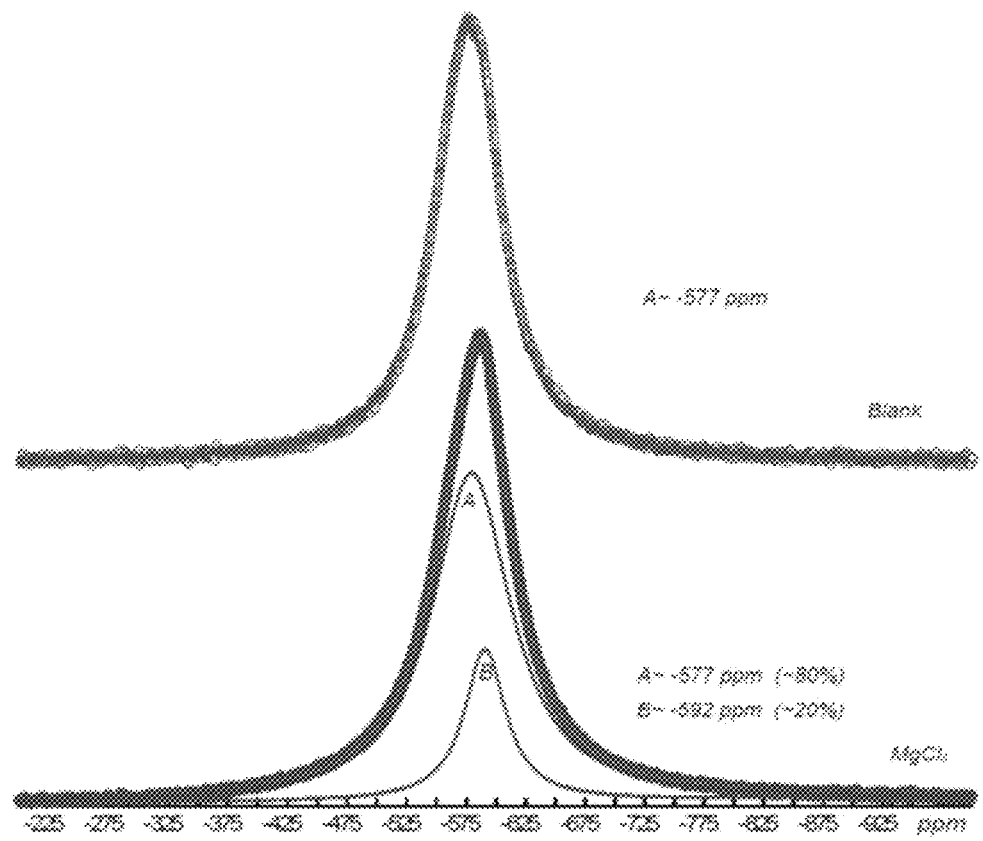
FIG. 7 shows $^{51}V$ NMR spectra of vanadate-based electrolytes with and without added components; the spectra were measured at 250K under 11 Tesla.

A $Mg_{2+}$-based added component was selected because its lower electronegativity can inhibit the proton loss from the coordinated water molecules and because it could also directly coordinate with the vanadate molecule through a bridging oxygen configuration. DFT analysis revealed a lower formation energy (~0.30 eV) for the $Mg_{2+}$-coordinated vanadate solvate structure (FIG. 6B) corroborating the advantages of the $Mg_{2+}$-based added component. Guided by this computational analysis, electrolytes were prepared with a high concentration (≥2 M) of vanadate and a low concentration (0.1 M) of $MgCl_2$ as an added component system. The $^{51}V$ NMR analysis of pristine and added component vanadate-based electrolytes is shown in FIG. 7. The added component-based electrolyte reveals the formation of new species indicated by a low-field resonance (peak B~−592 ppm) relative to the pristine vanadate electrolyte (peak A~−577 ppm), which corroborated the DFT-based prediction.

To further validate the identity of this new species under added component conditions, the $^{51}V$ NMR chemical shift was calculated for $[V_2O_3(H_2O)_7]^{4+}$ and $[VO_2Mg(H_2O)_9]^{3+}$ solvates as −562 and −584 ppm, respectively. The DFT derived chemical shifts are in good agreement with the observed chemical shifts of peak A and peak B, and confirm the formation of a $Mg_{2+}$-coordinated vanadate solvate structure. Such $Mg_{2+}$ coordination can effectively disrupt the hydrolysis-based network formation between successive vanadate molecules and thereby suppress the $V_2O_5$ precipitation.

Additional subject matter is disclosed in U.S. Pat. No. 8,628,880, which is incorporated by reference in its entirety herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An anolyte and catholyte system for use in an all vanadium sulfate acid redox flow battery system, comprising:
(i) an anolyte comprising
water,
1.0-2.5 M $VOSO_4$ and $H_2SO_4$ to provide 1.0-2.5 M vanadium as $V^{2+}$ and $V^{3+}$ and 4.5-6 M sulfate ions,
0.025-0.25 M magnesium ions, and
an anolyte dual-component system comprising 0.05-0.5 M chloride ions and 0.05-0.5 M phosphate ions; and
(ii) a catholyte comprising
water,
1.0-2.5 M $VOSO_4$ and $H_2SO_4$ to provide 1.0-2.5 M vanadium as $V^{4+}$ and $V^{5+}$ and 4.5-6 M sulfate ions,
0.025-0.25 M magnesium ions, and
a catholyte dual-component system comprising 0.05-0.5 M chloride ions and 0.05-0.5 M phosphate ions,
wherein components of the dual-component system do not change a redox reaction potential between $V^{5+}$ and $V^{4+}$ and do not react with sulfate.

2. The anolyte and catholyte system of claim 1, wherein the anolyte and the catholyte independently further comprise 0.05-1.5 M ammonium ions.

3. The anolyte and catholyte system of claim 2, wherein sources of the chloride ions, phosphate ions, magnesium ions, and ammonium ions are selected from $MgCl_2$, $(NH_4)_2HPO_4$, $(NH_4)H_2PO_4$, $(NH_4)_3PO_4$, $Mg(OH)_2$, HCl, $NH_4OH$, $H_3PO_4$, $NH_4Cl$, $MgHPO_4$, $Mg(H_2PO_4)_2$, $Mg_3(PO_4)_2$, and $NH_4Mg\,PO_4$.

4. The anolyte and catholyte system of claim 1, wherein the anolyte and catholyte independently are solutions prepared by combining water, $VOSO_4$, $H_2SO_4$, magnesium chloride, and ammonium phosphate.

5. The anolyte and catholyte system of claim 1, wherein:
(i) the anolyte and the catholyte independently comprise 1.5-2.0 M $VOSO_4$ and $H_2SO_4$ to provide 1.5-2.0 M vanadium and 4.5-6 M sulfate ions; or
(ii) the dual-component systems of the anolyte and the catholyte independently comprise 0.1-0.2 M chloride ions and 0.1-0.2 M phosphate ions; or
(iii) both (i) and (ii).

6. The anolyte and catholyte system of claim 5, wherein the dual-component systems of the anolyte and the catholyte independently comprise:
an amount of magnesium chloride to provide 0.05-0.1 M magnesium ions and 0.1-0.2 M chloride ions; and
an amount of ammonium phosphate to provide 0.2-0.4 M ammonium ions and 0.1-0.2 M phosphate ions.

7. An all-vanadium sulfate acid redox flow battery system comprising:
a cathode comprising graphite, graphene, or a carbon-based electrode;
an anode comprising graphite, graphene, or a carbon-based electrode;
a separator;
an anolyte comprising 1.0-2.5 M vanadium as $V^{2+}$ and $V^{3+}$ in an aqueous supporting solution; and
a catholyte comprising 1.0-2.5 M vanadium as $V^{4+}$ and $V^{5+}$ in an aqueous supporting solution, the anolyte and the catholyte independently comprising:
water,
1.0-2.5 M $VOSO_4$ and $H_2SO_4$ to provide 1.0-2.5 M vanadium and 4.5-6 M sulfate ions,
0.025-0.25 M magnesium ions,
0.05-0.5 M chloride ions, and
0.05-0.5 M phosphate ions,
wherein the system is operable over a temperature range from −5° C. to 50° C.

8. The battery system of claim 7, wherein the battery system has:
(i) a coulombic efficiency >90% at a current density from 10 mA/cm$^2$ to 320 mA/cm$^2$; or
(ii) an energy efficiency >75% at a current density from 10 mA/cm$^2$ to 320 mA/cm$^2$; or
(iii) a voltage efficiency >75% at a current density from 10 mA/cm$^2$ to 320 mA/cm$^2$; or
(iv) any combination of (i), (ii), and (iii).

9. The battery system of claim 7, wherein the magnesium ions and chloride ions are provided by magnesium chloride.

10. The battery system of claim 7, further comprising 0.05-1.5 M ammonium ions.

11. The battery system of claim 7, wherein the phosphate ions are provided by ammonium phosphate.

12. The battery system of claim 7, wherein the anolyte and catholyte independently comprise:
water;
1.5-2.0 M VOSO$_4$ and H$_2$SO$_4$ to provide 1.5-2.0 M vanadium and 4.5-6 M sulfate ions,
0.05-0.1 M magnesium ions,
0.1-0.2 M chloride ions, and
0.1-0.2 M phosphate ions.

13. The battery system of claim 12, wherein the anolyte and catholyte independently further comprise 0.2-0.4 M ammonium ions.

14. A method of making an electrolyte solution for an all-vanadium sulfate acid redox flow battery system, the method comprising:
dissolving amounts of VOSO$_4$ and H$_2$SO$_4$ in water to provide a solution comprising 1.0-2.5 M vanadium and 4.5-6 M sulfate ions;
adding an amount of a magnesium ion source to the solution to provide 0.025-0.25 M magnesium ions;
adding an amount of a chloride ion source to the solution to provide 0.05-0.5 M chloride ions;
adding an amount of an ammonium ion source to the solution to provide 0.05-1.5 M ammonium ions; and
adding an amount of a phosphate ion source to the solution to provide 0.05-0.5 M phosphate ions.

15. The method of claim 14, wherein the magnesium ion source, chloride ion source, ammonium ion source, and phosphate ion source are selected from MgCl$_2$, (NH$_4$)$_2$HPO$_4$, (NH$_4$)H$_2$PO$_4$, (NH$_4$)$_3$PO$_4$, Mg(OH)$_2$, HCl, NH$_4$OH, H$_3$PO$_4$, NH$_4$Cl, MgHPO$_4$, Mg(H$_2$PO$_4$)$_2$, Mg$_3$(PO$_4$)$_2$, and NH$_4$MgPO$_4$.

16. The method of claim 14, wherein magnesium chloride is the magnesium ion source and the chloride ion source.

17. The method of claim 14, wherein ammonium phosphate is the ammonium ion source and the phosphate ion source.

18. The method of claim 14, wherein:
(i) the amount of the magnesium ion source provides 0.05-0.1 M magnesium ions; or
(ii) the amount of the chloride ion source provides 0.1-0.2 M chloride ions; or
(iii) the amount of the ammonium ion source provides 0.2-0.4 M ammonium ions; or
(iv) the amount of the phosphate ion source provides 0.1-0.2 M phosphate ions; or
(v) any combination of (i), (ii), (iii), and (iv).

19. The method of claim 14, wherein magnesium chloride is the magnesium ion source and the chloride ion source, the method further comprising adding an amount of magnesium chloride to the solution to provide 0.05-0.1 M magnesium ions and 0.1-0.2 M chloride ions.

20. The method of claim 14, wherein ammonium phosphate is the ammonium ion source and the phosphate ion source, the method further comprising adding an amount of ammonium phosphate to the solution to provide 0.2-0.4 M ammonium ions and 0.1-0.2 M phosphate ions.

* * * * *